United States Patent Office 3,160,602
Patented Dec. 8, 1964

3,160,602
PROCESS OF PRODUCING AROMATIC
POLYESTERS
Simon W. Kantor, Schenectady, and Fred F. Holub,
Scotia, N.Y., assignors to General Electric Company, a
corporation of New York
No Drawing. Filed June 1, 1960, Ser. No. 33,124
16 Claims. (Cl. 260—47)

This invention relates to the production of synthetic, linear condensation polyesters. More particularly, it relates to an improved process for the preparation of completely aromatic polyesters. Still more particularly, it relates to an improved process for the making of completely aromatic polyesters of high intrinsic viscosity known as superpolyesters.

In the manufacture of linear superpolyesters by the melt or solution method, it has been found necessary to use either a dihydric alcohol or a dicarboxylic acid which is a member of the aliphatic series. Preferably, the dihydric alcohol is the aliphatic member and is usually a polymethylene glycol, e.g., ethylene glycol. The necessity for having part of the polyester molecule be a member of the aliphatic series is predicated on obtaining an intermediate condensation product having a low enough melting point which permits the resinous polyester to remain molten without decomposing during the continued condensation reaction to increase the molecular weight. Alternatively, since such synthetic linear condensation polyesters are soluble in a wide variety of solvents, they can be conveniently heated in solution to increase their molecular weight. In contrast, previous attempts to prepare linear condensation polyesters of a dihydric phenol and an aromatic dicarboxylic acid have produced low molecular weight polyesters which have such high melting points that decomposition results before the condensation products can be converted to polymers having the desired high molecular weight. Furthermore, these products are insoluble in all of the ordinary solvents, even at the reflux temperature and are so brittle that they are completely lacking in utility.

Because of this great difference between the all-aromatic polyesters and the polyesters which are at least partially aliphatic, a wide variety of general methods has been developed for the preparation of superpolyesters of the latter while no apparent general method has been developed for the preparation of useful linear condensation superpolyesters which are completely aromatic in structure, e.g., there is no aliphatic group in the molecular chain although they may be present as substituents on the aryl nucleus. For example, polymethylene terephthalates can be made from a polymethylene glycol and terephthalic acid by direct reaction of the ingredients, with the splitting out of water, or they can be made by an ester interchange reaction whereby terephthalic acid is reacted with the diacetate of the polymethylene glycol, or the polymethylene glycol and the dimethyl ester of terephthalic acid. Another method involves the reaction of terephthaloyl chloride with the polymethylene glycol with the splitting out of hydrochloric acid. Because of the relatively low melting point of the resulting polymethylene terephthalate, in the neighborhood of 258° C., it is possible to carry out these reactions to produce the desired high molecular weight by using a melt process. Furthermore, because of their relatively high solubility in ordinary solvents, these reactions likewise can be carried out in a wide variety of solvents. However, prior attempts to apply any of these reactions in the preparation of a polyester from a dihydric phenol and an aromatic dicarboxylic acid, or aromatic dicarbonyl chloride has resulted in no reaction occurring or only in the production of brittle products having very low molecular weight. Any attempt to convert the low molecular weight products to desired high molecular weight materials resulted in decomposition.

Therefore, a principal object of this invention is to provide a simple, economical process for the preparation of linear superpolyesters from an aromatic dicarboxylic acid and a dihydric phenol, whereby the superpolyesters can be produced having a high molecular weight as shown by having an intrinsic viscosity of at least 0.5.

Another object of the invention is to prepare a linear, highly polymeric, completely aromatic condensation superpolyester at atmospheric pressure and below the temperature at which the polymers are thermally unstable.

These and other objects of this invention will be readily apparent to those skilled in the art, from the following description.

Our process comprises reacting a dihydric phenol and an aromatic carbonyl halide while dissolved in a solvent selected from the group consisting of benzophenone, m-terphenyl, chlorinated biphenyls, e.g., biphenyl having from 1–10 chlorine atoms on the aryl nucleus and mixtures thereof, brominated biphenyls, e.g., biphenyls having from 1–10 bromine atoms on the aryl nucleus and mixtures thereof, chlorinated diphenyl oxides, e.g., diphenyl oxide having from 1–10 chlorine atoms on the aryl nucleus and mixtures thereof, and brominated diphenyl oxides, e.g., diphenyl oxide having from 1–10 bromine atoms on the aryl nucleus and mixtures thereof, at a temperature of from 270° C. up to reflux temperature of the solution until evolution of the hydrohalide ceases. On cooling to about 250° C. or lower, e.g., room temperature, the polymer precipitates from any of these solvents and can be isolated by the simple procedure of spray drying, evaporation of the solvent, centrifugation, or filtering and washing the precipitated polymer free of the solvent by means of a liquid, for example, an aliphatic alcohol, ether, ketone, hydrocarbon, etc., in which the solvent used in the condensation reaction, but not the polymer, is soluble and which can be readily removed from the polymer by evaporation. Examples of such liquids are ethers, for example diethyl ether, methyl ether, methyl ethyl ether, dipropyl ether, etc., ketones, for example, acetone, diisobutyl ketone, methyl ethyl ketone, etc., alcohols, for example, ethyl alcohol, methyl alcohol, amyl alcohol, etc.

Unexpectedly we have found that the high molecular weight superpolyesters produced by our process are entirely different in kind than the corresponding products produced by the prior art. For example, polymeric p-phenylene isophthalate and m-phenylene terephthalate prepared by the interfacial polycondensation of hydroquinone with isophthaloyl chloride and resorcinol with terephthaloyl chloride, respectively, are described as being insoluble and infusible polymers. These same polymers prepared by our process are soluble at elevated temperatures in the solvents in which they are made and have softening points of 411–414° C. and 281–295° C., respectively, and can be shaped using heat and pressure into useful objects such as films at pressures as low as 500–1000 p.s.i. and temperatures of 410–415° C. and 310–325° C., respectively. Although we do not wish to be bound by theory, it appears that the products prepared by our process can flow and knit together under heat and pressure while the prior art materials cannot. This may be because the prior art processes produce cross-linked materials whereas our process produces linear materials.

The highly polymeric linear condensation polyesters which can only be produced by the methods of this invention and our related applications in the form of moldable, high molecular weight polymers, are the hydroquinone polyesters of isophthalic acid, the resorcinol esters of terephthalic acid, and the copolymer compositions produced by the cocondensation where part of the hydroquinone or resorcinol has been replaced by another dihydric phenol and, if desired, some of the isophthalic or terephthalic acid has been replaced with another aromatic dicarboxylic acid. Examples of some of the dihydric phenols which may be used to replace a minor amount of the hydroquinone or resorcinol are, for example, hydroquinone, catechol, resorcinol, the dihydroxybiphenyls, e.g., 2,2′ - dihydroxybiphenyl, 3,3′ - dihydroxybiphenyl, 4,4′-dihydroxybiphenol, 2,4′ - dihydroxybiphenyl, 2,5 - dihydroxybiphenyl, 3,4 - dihydroxybiphenyl, etc., the dihydroxydiphenyl oxides, e.g., 2,2′-dihydroxydiphenyl oxide, 3,3′ - dihydroxydiphenyl oxide, 4,4′ - dihydroxydiphenyl oxide, etc., the dihydroxynaphthalenes, e.g., 1,4-dihydroxynaphthalene, 1,6 - dihydroxynaphthalene, etc., and the chlorinated derivatives of such dihydric phenols in which one or more of the hydrogen atoms in the aryl nucleus is replaced with a halogen atom, e.g., fluorine, bromine, iodine, but preferably chlorine, examples of which are chlorohydroquinone, dichlorohydroquinone, bromoresorcinol, fluorocatechol, etc.

Typical examples of aromatic dicarboxylic acids in the form of their dicarbonyl halides which may be used to replace a minor amount of the isophthaloyl halide or terephthaloyl halide in our process are the acid halides of terephthalic acid, isophthalic acid, o-phthalic acid, the diphenic acids, e.g., 2,2′-diphenic acid, 2,4′-diphenic acid, etc., the naphthalene dicarboxylic acids, e.g., 1,4-naphthalene dicarboxylic acid, 1,8-naphthalene dicarboxylic acid, etc., and the halogenated derivatives of such acids, whereby one or more of the hydrogen atoms attached to the aryl nucleus are replaced by a halogen atom, preferably a chlorine atom.

The aromatic dicarbonyl halides may be the fluorides, chlorides, bromides, or iodides, e.g., isophthaloyl fluoride, isophthaloyl chloride, isophthaloyl bromide, isophthaloyl iodide, etc., and the corresponding and related derivatives of the above named acids, e.g., terephthaloyl chloride, o-phthaloyl bromide, the diphenoyl chlorides, the naphthalene dicarbonyl bromides, etc., including the halogenated derivative thereof, e.g., the chloroisophthaloyl chlorides, the chloroisophthaloyl bromides, the bromoisophthaloyl chlorides, the iodoisophthaloyl iodides, etc., e.g., the chloroterephthaloyl chlorides, the bromo-o-phthaloyl bromides, the chlorodiphenoyl bromides, the bromonaphthalene dicarbonyl chlorides, etc., and the corresponding and related derivatives of the above acids, etc. Since these aromatic dicarbonyl halides react with dihydric phenol to produce esters with the elimination of hydrogen halide, the particular halide in the carbonyl halide group has no effect on the final chemical composition of the ester since it is eliminated as the hydrogen halide. Since hydrogen fluoride is extremely corrosive, and the carbonyl bromides and carbonyl iodides are very expensive compared to the corresponding carbonyl chlorride there is no advantage to using any carbonyl fluoride, carbonyl bromide, or carbonyl iodide. Therefore, we prefer to use carbonyl chlorides.

Our process is particularly adaptable for the preparation of the following compositions which are more particularly described and claimed in our copending application, filed concurrently with the present application and assigned to the same assignee as the present invention.

(1) Linear superpolyesters of p-phenylene isophthalate and chloro-p-phenylene isophthalate having an intrinsic viscosity of at least 0.5 measured at 75° C., disclosed and claimed in our copending application Serial No. 33,131.

(2) Linear superpolyesters formed of p-phenylene isophthalate units interspersed with p-phenylene terephthalate units, the intrinsic viscosity of the polyester being at least 0.5 measured at 75° C., and the isophthalate content being at least 60 mole percent of the total isophthalate and terephthalate content of the superpolyester, disclosed and claimed in our copending application Serial No. 33,125, now U.S. 3,036,990.

(3) Linear superpolyesters formed of p-phenylene isophthalate units interspersed with p,p′-biphenylene isophthalate units, the intrinsic viscosity of the superpolyester being at least 0.5 measured at 75° C., and the p-phenylene isophthalate units being at least 40 mole percent of the total p-phenylene isophthalate and p,p′-biphenylene isophthalate units in the superpolyester, disclosed and claimed in our copending application Serial No. 33,126, now U.S. 3,036,991.

(4) Chlorine-containing p - phenylene isophthalate, linear superpolyesters having an intrinsic viscosity of at least 0.5 measured at 75° C., wherein at least 15 mole percent of the isophthalate groups have from one to two chlorine substituents on the aryl nucleus and the p-phenylene radicals are selected from the group consisting of p-phenylene, monochloro - p - phenylene, and dichloro-p-phenylene radicals, disclosed and claimed in our copending application Serial No. 33,127.

(5) Linear, superpolyesters having an intrinsic viscosity of 0.5 measured at 75° C., formed of the four structural units (1) p-phenylene units (2) units selected from the group consisting of o-phenylene units, m-phenylene units and o,o′-biphenylene units (3) isophathalate units and (4) terephthalate units, the sum of (1), (2), (3) and (4) equalling 100% of the total units of the polymer, the units of (1) being from 25 to 45% of the total units, the units of (2) being from 5 to 25% of the total units, the units of (3) being from 20 to 45% of the total units, the units of (4) being from 5 to 30% of the total units, the units of (1) and (2) forming esters with the units of (3) and (4), the sum of (1) and (2) being from 1 to 1.05 times the sum of (3) and (4) and the sum of (1) and (4) being no greater than 0.7 times the total sum of units, disclosed and claimed in our copending application Serial No. 33,128, now U.S. 3,036,992.

(6) Linear superpolyesters formed of m-phenylene terephthalate units interspersed with from 0 to 30 mole percent of p-phenylene terephthalate units, based on the total m-phenylene terephthalate and p-phenylene terephthalate units, the intrinsic viscosity of said superpolyester being at least 0.5 measured at 75° C., disclosed and claimed in our copending application Serial No. 33,130.

In addition to the above superpolyesters which cannot be made by the processes disclosed in the prior act, our process can be used, if desired, to produce the polyesters which are producible by the prior art processes, including polyesters of aliphatic glycols and aliphatic dicarboxylic acids. Our process is especially useful for making superpolyesters of dihydric phenols and aromatic dicarboxylic acids.

The dihydric phenols useful in the present invention will in general conform to the formula:

I 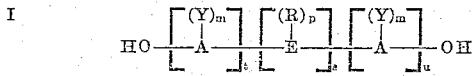

in which A is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidine, etc. Where E is an alkylene or alkylidene group, it may also consist of two or more alkylene or alkylidene groups, connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group (e.g. cyclopentyl, cyclohexyl), a sulfur-containing linkage, such as sulfide, sulfoxide or sulfone; an ether linkage; a carbonyl group; a tertiary nitrogen group, or a silicon-containing linkage such as silane or siloxy. Other groups which E may represent will occur to those skilled in the art. R is hydrogen or a monovalent hydrocarbon group such as alkyl (methyl, ethyl, propyl, etc.), aryl (phenyl, naphthyl, etc.), aralkyl (benzyl, ethylphenyl, etc.) or cycloaliphatic (cyclopentyl, cyclohexyl, etc.). Y may be an inorganic atom such as chlorine, bromine, fluorine, etc.; an inorganic group such as the nitro group, etc.; an organic group such as R above, or an oxy group such as OR, it being only necessary that Y be inert to and unaffected by the reactants and the reaction conditions. The letter $m$ is any whole number from and including zero through the number of positions on A available for substitution; $p$ is any whole number from and including zero through the number of available positions on E; $t$ is a whole number equal to at least one, $s$ is either zero or one, and $u$ is any whole number including zero.

In the dihydric phenol compound represented by Formula I above, when more than one Y substituent is present, they may be the same or different. The same is true for the R substituent. Where $s$ is zero in Formula I and $u$ is not zero, the aromatic rings are directly joined with no intervening alkylene or other bridge. The positions of the hydroxyl groups and Y on the aromatic nuclear residues A can be varied in the ortho, meta, or para positions and the groupings can be in a vicinal, asymmetrical or symmetrical relationship, where two or more ring carbon atoms of the aromatic hydrocarbon residue are substituted with Y and the hydroxyl group.

Examples in addition to those previously given, are dihydric phenols in which the phenolic hydroxyls are on separate aryl nuclei which are joined by an aliphatic group, a sulfoxide group, a sulfonyl group, a carbonyl group, oxygen, tertiary nitrogen, sulfur, etc., e.g., 2,2-bis-(4-hydroxyphenyl)propane,
2,4'-dihydroxydiphenylmethane;
bis-(2-hydroxyphenyl)-methane;
bis-(4-hydroxyphenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-propane;
2,2-bis-(4-hydroxyphenyl)-1-phenylpropane;
2,4-dihydroxybenzophenone;
4,4'-dihydroxydiphenyl sulfone;
2,4'-dihydroxydiphenyl sulfone;
5'-chloro-2,4'-dihydroxydiphenyl sulfone;
3'-chloro-4,4'-dihydroxydiphenyl sulfone;
4,4'-dihydroxytriphenyl disulfone;
4,4'-dihydroxydiphenyl ether;
4-hydroxyphenyl,
4-hydroxy-o-biphenyl ether;
the 4,3'-, 4,2'-, 4,1'- 2,2'- 2,3'-, etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,2'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,2'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxy-diphenyl ether, etc., dihydric phenols substituted on the aryl nucleus with alkyl, alkenyl, cycloaliphatic, cycloalkenyl, nitro, sulfonyl, halogen, aryl, alkaryl, numerous examples of which have been given above as well as dihydroxy acetophenone, the dihydroxy toluenes, the dihydroxy xylenes, dihydroxy pyridines, dihydroxy anthraquinones, dihydroxy benzaldehydes, dihydroxy benzoic acids, dihydroxy benzophenones, chlorohydroquinones, fluororesorcinols, bromocatechols, phenyl hydroquinones, benzyl resorcinols, etc. Likewise, the aromatic dicarbonyl halides may have separate aryl nuclei joined together or the aryl nucleus substituted in the same way as disclosed above for the dihydric phenols, e.g., a carbonyl halide group (COX where X is halogen as previously defined) replaces each of the two OH groups in Formula I. These substituents have no effect on the ability of the materials to form polyesters and therefore our process is broadly applicable to the formation of aromatic superpolyesters of dihydric alcohols and aromatic dicarboxylic acids.

The function of the above-named solvents is two-fold; one, it permits a temperature of at least 250° C. to be reached, which is required to provide sufficient condensation to produce the high molecular weights, and at the same time produces a homogeneous solution of the ingredients having a low enough viscosity that heat transfer is high enough to prevent overheating and thermal decomposition of the product. However, these solvents also provide an unidentified function, since not all materials which are capable of dissolving the reactants and polymeric product and have high enough boiling points are useful in our process. For example, such closely related materials as diphenyl sulfone, diphenyl phosphate, o-nitrobiphenyl, 2,3-benzodiphenylene oxide, 4-biphenyl carbonitrile, and anthracene, although they are good solvents for both the starting materials and the reaction products, cannot be substituted for our particular solvents, since they do not permit the obtaining of high molecular weight linear condensation polymers, even though their boiling point is high enough to attain the required high temperature. Materials such as para-phenyl anisole, 4-phenoxy anisole, phenylbenzoate, and so forth, are solvents for some of the completely aromatic polyesters but are not suitable for use in our process, since the products made in these solvents have low molecular weights. Materials such as diphenyl, diphenyl oxide, o-terphenyl, acenaphthalene, anisole, chlorobenzene, etc., cannot be used since they are not solvents for the high molecular weight, high melting point, polymeric products. As a consequence, as soon as such polymers form, they precipitate as a very low molecular weight material. Solvents containing active hydrogen, such as amines, alcohols, phenols, carboxylic acids, etc., and certain hydrocarbons, cannot be used since they are reactive with the starting materials. Many other materials have too low a boiling point to permit the attainment of the necessary temperature to produce the high molecular weight materials obtainable by our process.

The halogenation of biphenyl and diphenyl oxide usually leads to a mixture of isomers and this is especially true if the amount of halogenating agent reacted exceeds the amount required to produce the monohalogenated product. Insofar as solvents for our process are concerned, it does not matter whether the pure halogenated product or the mixture of isomers is used, or even a mixture of the solvents is used. From a practical standpoint, it is desirable to use the mixture of isomers since the melting point of the mixture is usually lower than the melting point of any of the pure materials of the same halogen content. They are more readily available commercially and the cost is considerably less than that of the pure compound. These mixed isomers are usually designated by their halogen content, e.g., a 50% chlorobiphenyl would have a chlorine content of 50% by weight corresponding to a mixture of tetrachlorobiphenyls. Because they are readily available as a commercial product at a reasonable cost and are excellent solvents for the aromatic polyesters, we prefer to use the chlorinated diphenyl oxides and especially the chlorinated biphenyls. Both of these materials are available as mixtures of isomers with chlorine contents of the mixtures corresponding to mono-, di-, tri-, up to approximately the heptachloro derivatives.

All of our solvents have boiling points greater than 260° C. so that they may be used at atmospheric pressure. However, the use of subatmospheric or superatmospheric pressure is not precluded. For example, reduced pressure can be used in the final stages of the reaction to insure removal of all the hydrogen halide and superatmospheric pressure can be used during the initial stages to prevent loss of the initial reactants.

In general, it is desirable to add a diphenol and the aromatic dicarbonyl halide to the solvent at room temperature if the solvent is liquid at this temperature, or at or near the melting point if the solvent is a solid at room temperature. The solution is gradually heated to the reaction temperature, care being taken to govern the heating rate so that there is no quick evolution of hydrogen halide which can cause some of the reactants to be erupted from the reaction vessel. Furthermore, since the starting materials would be extremely volatile at the reaction temperature, it is desirable that initial reaction take place at a relatively low temperature, so as to form low molecular weight polymers which will not be lost by volatilization from the reaction vessel. On the other hand, the heating rate preferably should not be so slow that the polymer forms and precipitates from the solution because of insolubility at the lower temperature. However, precipitation of the material at this point causes no trouble since the precipitate dissolves readily as the temperature is increased up to the reaction temperature.

The amount of each starting reactant used is preferably within 5 mole percent and more desirably within 3 mole percent of the stoichiometric molar proportions required to produce complete esterification of the reactive groups, e.g., there is from 1 to 1.05, and preferably from 1 to 1.03 phenolic hydroxyls for each carbonyl halide group. The concentration of the reactants should be such that the final concentration of the polyester will be no more than 10 to 15 percent, by weight, of the total weight of the solution. We have found that higher concentrations can be used, but the viscosity of the resulting solution is so high that a film tends to form on the reaction vessel which interferes with good heat transfer and thereby results in some decomposition of the polymer. Under equal conditions, using the same reactants and solvents, we have found that higher intrinsic viscosities are obtained if the reactants are stirred.

By the time that the reaction temperature has reached 270° C., the reaction has usually proceeded to about 90 percent completion and is usually 99 percent complete after about one-half hour at the reaction temperature, as can be easily detected by noting the amount of hydrogen halide evolved. We prefer to use temperatures of from 270° C. up to the reflux temperature of the solution. Usually the temperature is in the range of 290 to 330° C. at atmospheric pressure. The higher boiling solvents and higher reaction temperatures are used for those polymers that are least soluble, e.g., the polymers of p-phenylene isophthalate which tends to precipitate at temperatures below about 300 to 305° C. Continuing the reaction for 60 to 120 minutes increases the intrinsic viscosity somewhat, but reaction periods longer than this are usually not necessary for obtaining the desired high molecular weights. In fact, in those experiments in which the reaction period was carried out for as long as 8 hours, the intrinsic viscosity was essentially no greater at the end of this time than it was at the end of two hours.

At the end of the reaction time, the source of heat is removed and stirring is continued. As the solution cools, the polymer starts to precipitate in the temperature range of about 200° C. to 300° C. depending on the chemical composition and molecular weight of the polymer and the specific solvent. The polymer may be filtered from the cooled solution but normally we have found it desirable to add a liquid which is a non-solvent for the polymer, but which is miscible with the solvent used in the condensation reaction and which will aid in the filtration process. The particular diluent is not critical. Such materials can be alcohols, ethers, hydrocarbons, or ketones, examples of which have been previously given, which are readily available and are easily removed so that the reaction solvent can be reused. The filtered polymer is usually washed several times with such a material to remove all the last traces of the reaction medium. Alternatively, the reaction solvent may be flashed from the polymer, e.g., by spray drying, or evaporated by distillation, e.g., at reduced pressure.

If it is desired to modify the molecular weight of our linear polyesters, chain stopping agents such as one or more monohydric phenols or one or more monobasic acid chloride may be added in minor amounts, e.g., 0.1 to 1% of the corresponding difunctional compound may be added along with the other ingredients, during the condensation reaction, or after the main condensation reaction is completed. Examples of monohydric phenols which may be added are phenol itself, the cresols, e.g., ortho-, meta- and para-cresol, the xylenols, e.g., 2,3-xylenol, 2,4-xylenol, 2,5-xylenol, 2,6-xylenol, 3,5-xylenol, etc., the hydrocarbons and hydrocarbonoxy-substituted phenols, e.g., ethylphenol, propylphenol, isopropylphenol, butylphenol, tertiary butylphenol, amylphenol, the phenylphenols, naphthylphenols, the phenoxyphenols, the methoxyphenols, ethoxyphenols, phenoxyphenols, etc., including all of those phenols in which one or more of the hydrogen atoms attached to the aryl nucleus are replaced by a halogen atom such as fluorine, chlorine, bromine, or iodine, e.g., the mono-, di-, tri-, tetra- and penta-chlorophenols, the mono-, di-, tri-, tetra- and penta-bromophenols, the mono-, di-, tri-, tetra-, and penta-iodophenols, the mono-, di-, tri-, tetra- and penta-fluorophenols, the mono-, di-, tri-, tetra-chlorocresols, and the mono-, di-, tri-, chloroxylenols, etc. The monohydric phenol may also be a di- or tri-hydric phenol in which all but one hydroxyl group has been esterified with an acid, e.g., p-hydroxyphenylbenzoate, p-hydroxyphenyltoluate, m-hydroxyphenylbenzoate, o-hydroxyphenylbenzoate, 5-hydroxyphenylene-1,3-dibenzoate, etc.

In those cases where free hydroxyl groups are desired in the polymer chain, a dihydric phenol, e.g., hydroquinone, resorcinol, etc., may be used as the chain stopping agent.

Monobasic acid halides which may be used are the acid halides of the aromatic series such as benzoyl chloride, benzoyl bromide, benzoyl iodide, toluoyl chloride, naphthoyl chloride, biphenylcarbonyl chloride, etc., including halogenated derivatives thereof. Although monobasic acid halides of the aliphatic series may be used, we prefer not to use them, since they destroy the high temperature stability of the polymers. For the same reason, we prefer that the esters of the di- and tri-hydric phenols be aromatic monocarboxylic acid esters and that, if substituted, the substituent grouping be chlorine.

Other modifications will be readily apparent to those skilled in the art to obtain modifications of the properties of the polymers; for example, when more than one dihydric phenol is to be used or more than one aromatic dicarbonyl halide is to be used, all of the ingredients may be incorporated at once, or some of them added during the condensation reaction, or one of the dihydric phenols may be reacted with part of the dicarbonyl halide to obtain partial condensation products which are then mixed and co-reacted together to give block type, linear polymers. We have found that such a reaction is very desirable if terephthaloyl chloride is to be used, for example, in making a superpolyester of p-phenylene isophthalate cocondensed with p-phenylene terephthalate. Because of the extreme insolubility of p-phenylene terephthalate, even in our solvents, and its extremely high melting point, we have found that it is desirable to react all of the hydroquinone with all of the isophthaloyl halide and then to add the terephthaloyl halide and co-react it in a second step.

The molecular weights of the linear condensation polymers prepared by our process are extremely difficult to measure, because of the insolubility of the polymers in solvents at room temperature. Many of the known solvents for the polymers require an elevated temperature to keep the polymers into solution and these solvents readily attacked any of the semipermeable membranes necessary to determine molecular weight by osmotic methods. Light scattering methods of determining molecular weight are not as accurate as osmotic methods because of the difficulty of making accurate measurements and interpretation of the results. On the other hand, intrinsic viscosities are relatively easy to obtain and are an accurate measure of the relative degree of polymerization in comparing the polymers. Intrinsic viscosity is well known in the art and is defined, for example, on page 309 of the book by P. J. Flory, "Principles of Polymer Chemistry," Cornell University Press, Ithaca, New York, 1953.

In general, we have found that it is desirable in order to obtain the lightest color products to exclude air from the reaction vessel by the introduction of an inert gas, for example, nitrogen, argon, neon, etc. Also, to obtain the products having the highest intrinsic viscosity and optimum properties, moisture should be excluded during handling and weighing operations, and also during the reaction, to prevent conversion of some of the acid halide groups to carboxyl groups. Normally, the reaction may be carried out at atmospheric pressure, but may be carried out at sub-atmospheric or super-atmospheric pressure, if desired. However, no advantage is to be gained by such practice, and it would increase unnecessarily the cost of making the linear condensation products.

In general, the reaction is carried out in a covered vessel which may be made of glass, glass-coated steel, or other materials resistant to hydrogen halides, and also are not reactive with the starting materials at the reaction temperature used. The vessel normally is equipped with a stirrer, an inlet, an outlet for the inert gas, and a thermometer well. Heating may be performed by direct firing with a gas flame or indirectly by means of a heat transfer agent which may be either liquid or gaseous, or by electricity.

In order that those skilled in the art may practice our invention, the following examples are given by way of illustration, and not by way of limitation.

*Example 1*

A mixture of 1.38 grams of hydroquinone, 2.5 grams of isophthaloyl chloride, and 27 grams of mixed trichlorobiphenyls was stirred while heating. After 2 minutes the temperature was 155° C. A homogeneous solution was obtained and the evolution of HCl had started. After 6½ minutes the temperature had reached 320° C. and the HCl evolution had slowed down considerably. The resulting solution was stirred and refluxed for an additional 30 minutes at a temperature of 305° to 320° C., to yield a viscous, yellow solution. The solution was allowed to cool, thereby precipitating the polymer at a temperature of 265° C. When the mixture had cooled to room temperature the polymer was separated from the reaction mixture and slurried four times with hot acetone, filtered and allowed to dry by suction. There was obtained 2.75 grams of p-phenylene isophthalate polymer which had an intrinsic viscosity of 0.73 in trichloroacetic acid at a temperature of 75° C. Another sample of this polymer was pressed between aluminum foil at 415° C. under a pressure of 2000 lbs./sq. inch. The pressed film was quenched to room temperature by placing the hot film in ice-cold water immediately upon removal from the press. The resulting film was clear, flexible and tough.

A number of poly-p-phenylene isophthalate polymers were prepared in other mixed chlorinated biphenyls. These polymers are listed below in Table I. The solvent column includes the chlorine content of the solvents, while the third column lists the reaction conditions including the times of polymerization and maximum reaction temperatures. All the polymers in Table I were prepared using the conditions given above for Example 1. In all cases the films pressed from these polymers were clear, flexible and tough.

TABLE I

| Solvent | | Reaction Conditions | | Yield, percent | Intrinsic Viscosity [a] |
|---|---|---|---|---|---|
| Name | Percent Cl | Time, Min. | Temp., °C. | | |
| Tetrachlorobiphenyls | 48 | 30 | 310–316 | 97.4 | 0.62 |
| Pentachlorobiphenyls | 54 | 30 | 310–325 | 95.2 | 0.66 |
| Hexachlorobiphenyls | 60 | 30 | 320–325 | 91.7 | 0.61 |
| Heptachlorobiphenyls | 62 | 30 | 320–326 | 92.9 | 0.64 |

[a] The intrinsic viscosity was measured in trichloroacetic acid at 75° C.

*Example 2*

This example illustrates the 1-stage method of making our copolymer.

In the following experiment the reagents were redistilled and all the weighings were made in a dry-box filled with dry nitrogen gas. The reaction mixture was heated by means of a molten solder bath. A mixture of 11.34 grams (0.103 mole) of hydroquinone, 15.22 grams (0.075 mole) of isophthaloyl chloride, 5.08 grams (0.025 mole) of terephthaloyl chloride, and 220 grams of mixed trichlorobiphenyls were placed in a 1-liter reaction vessel. The reaction mixture was stirred and heated. After 1.5 minutes a homogeneous, yellow solution was obtained at 150° C. After 6 minutes of heating the temperature was 300° C. and most of the HCl evolution had subsided. The reaction mixture was heated for another 121 minutes at a temperature of 310° C. to give a very viscous solution. The mixture was cooled allowing the polymer to precipitate at 258° C. and forming a stiff, pasty mixture. When cooled to room temperature, one liter of boiling acetone was added and the polymer was dispersed in a blender. The polymer was washed 4 times with 1-liter portions of boiling acetone, filtered, dried by suction for 2 hours and finally dried overnight in air. There was obtained 23.6 grams of white polymer. A sample of this polymer had an intrinsic viscosity of 0.98 in 2,4,6-trichlorophenol at 75° C. The total chlorine content of this polymer was 0.029%. A one-gram sample of polymer was pressed between aluminum foil at a temperature of 415° C. under a pressure of 2000 lbs./sq. inch. The resulting hot film was quenched in water to yield a slightly hazy, tough, flexible film. This haziness may be eliminated by decreasing the terephthalate content or by making this composition in a 2-stage reaction, as illustrated by Example 3.

*Example 3*

All the reagents used in this experiment were redistilled. The weighings were made in a nitrogen-filled dry box.

A mixture of 11.40 grams (0.1035 mole) of hydroquinone, 15.23 grams (0.0750 mole) of isophthaloyl chloride and 220 grams of mixed trichlorobiphenyls were placed in a 1-liter open reaction flask. The mixture was stirred and heated, and after 5 minutes, a homogeneous yellow solution was obtained at 300° C. Most of the HCl evolution had subsided at this time. After a total of 10 minutes of heating, the reaction temperature was 310° C., at which time a solution of 5.07 grams (0.0250 mole) of terephthaloyl chloride in 40 grams of mixed trichlorobiphenyls was slowly added from a dropping funnel. The addition took 4 minutes after which another 20 grams of mixed trichlorobiphenyls was added to wash the residual acid chloride solution from the funnel into the reaction mixture. At the end of 36 minutes of total reaction, the solution had become viscous and the temperature was 310° C. The reaction was allowed to proceed for an additional 100 minutes at a temperature of 310° C. At the end of this time, the solution was allowed to cool and the polymer precipitated at 250° C. to yield a pasty mixture. When this mixture had cooled to room temperature, it was diluted with one liter of acetone and the polymer was vigorously stirred in a blender, washed 4 times with 1-liter portions of hot acetone, filtered, dried by suction and finally dried overnight in air. There was obtained 23.8 grams (98.1%) of white polymer. A sample of this polymer had an intrinsic viscosity of 1.14 in 2,4,6-trichlorophenol at 75° C. On analysis, this polymer was found to have a total chlorine content of 0.020% chlorine. The extremely low chlorine content of Examples 2 and 3 illustrates the effect of using a slight excess of dihydric phenol reactant. A one-gram sample of this polymer was pressed between aluminum foil at a temperature of 415° C. under a pressure of 2000 lbs./sq. inch. The resulting quenched film was a colorless, tough, flexible film.

*Example 4*

A mixture of 4.40 grams of hydroquinone, 1.85 grams of 4,4'-dihydroxybiphenyl, 10.15 grams of isophthaloyl chloride, and 100.0 grams of redistilled mixed pentachlorobiphenyls was stirred and heated under nitrogen. After 4 minutes the temperature of the homogeneous yellow solution was 200° C. and the HCl evolution was vigorous. After 11 minutes the temperature had reached 340° C. and the reaction was allowed to proceed for an additional 9 minutes at 360° C. resulting in the formation of a yellow viscous solution. This solution was allowed to cool whereby the polymer precipitated at a temperature of approximately 260° C. When the mixture had cooled to room temperature, the polymer was separated from the reaction mixture and washed twice with 500 ml. portions of hot acetone, filtered and dried to yield 12.3 grams of polymer. A sample of this polymer had an intrinsic viscosity of 0.53 in a 50–50 mixture of o-chlorophenol and 2,4,6-trichlorophenol at 117° C. This polymer had a melting point of 360°–370° C. and was molded between aluminum foil at a temperature of 405° C. under a pressure of 2000 lbs./sq. inch. After quenching in water the resulting film was transparent, flexible, and tough.

*Example 5*

A mixture of 7.88 grams (0.0715 mole) of hydroquinone, 20.30 grams (0.100 mole) of isophthaloyl chloride and 238.5 grams of mixed trichlorobiphenyls was heated and stirred. After 1.5 minutes, the temperature of the reaction was 140° C. and the HCl evolution had started. After 10 minutes the temperature had reached 298° C. at which time most of the HCl solution had subsided. The mixture was stirred and heated for another 3½ minutes at a temperature of 298°–300° C. At this time, the reaction mixture was cooled to 140° C., which caused the polymer to precipitate and 5.59 grams (0.030 mole) of 4,4'-dihydroxybiphenyl was added. The stirring and heating were resumed. After 14 minutes the temperature had risen to 323° C. and the polymer was completely in solution. The reaction mixture was heated and stirred for another 25 minutes at a temperature of 317°–325° C. The resulting solution was quite viscous and was allowed to cool whereby the polymer precipitated at a temperature of 243° C. When cooled to room temperature the polymer was separated from the reaction mixture and washed 4 times with 1-liter portions of hot acetone, filtered and dried by suction for 1½ hours, followed by overnight drying in air. There was obtained 25.7 grams (97%) of polymer which had a melting point of 355°–372° C. A sample of this polymer had an intrinsic viscosity of 0.70 in 2,4,6-trichlorophenol at 75° C. A one-gram sample of the polymer was pressed between aluminum foil at a temperature of 380° C. under a pressure of 2000 lbs./sq. inch. The resulting quenched film was transparent, colorless, and flexible.

*Example 6*

A mixture of 11.34 grams (0.103 mole) of hydroquinone, 23.75 grams (0.10 mole) of 5-chloroisophthaloyl chloride and 250 grams of redistilled mixed trichlorobiphenyls were stirred and heated. After one minute the temperature of the homogeneous solution was 140° C., and the evolution of HCl had started. After 12 minutes the reaction mixture was at 310° C. and most of the HCl evolution had subsided. The reaction mixture was heated for an additional 53 minutes at a temperature of 312° C. At the end of this time a viscous, yellow solution resulted. When this solution was allowed to cool, the polymer precipitated at 165° C. to yield a pasty mixture. After the mixture was at room temperature, one liter of acetone was added and the polymer was triturated in a blender. The polymer was isolated and washed 4 times with 1-liter portions of boiling acetone, filtered and dried by suction to yield 26.90 grams (96.8%) of white polymer having an intrinsic viscosity of 1.28 in trichlorophenol at 150° C. A film of this polymer was pressed between aluminum foil at a temperature of 400° C. under a pressure of 2000 lbs./sq. inch. The resulting film was transparent and quite tough and flexible. The melting point of this polymer was 323° to 349° C.

*Example 7*

A mixture of 8.41 grams (0.0765 mole) of hydroquinone, 2.80 grams (0.0255 mole) of resorcinol, 16.24 grams (0.0800 mole) of isophthaloyl chloride, 4.06 grams (0.0200 mole) of terephthaloyl chloride, and 200 grams of redistilled mixed trichlorobiphenyls were stirred and heated under nitrogen. After 4 minutes a homogeneous yellow solution was obtained and the HCl evolution had started. After 11 minutes the reaction mixture had reached 300° C. and the HCl evolution had slowed down. The reaction mixture was heated for an additional 21 minutes at a temperature of 300°–315° C. to give a viscous, yellow solution of polymer. The mixture was cooled and the polymer precipitated at 190° C. to give a pasty mixture. When cooled to room temperature the isolated polymer was washed 3 times with 1-liter portions of refluxing acetone, filtered and dried to yield 23.8 grams of polymer. A sample of this polymer had an intrinsic viscosity of 0.76 in 2,4,6-trichlorophenol at 75° C. The melting point of this polymer was 303°–332° C. A one-gram sample of polymer was pressed between aluminum foil at a temperature of 355° C. and a 1000 lbs./sq. inch pressure. The resulting quenched film was transparent, flexible and tough.

*Example 8*

A mixture of 7.80 grams of hydroquinone, 5.60 grams of o,o'-dihydroxybiphenyl, 10.15 grams of isophthaloyl chloride, 10.15 grams of terephthaloyl chloride, and 177.5 grams of redistilled mixed monochlorobiphenyls was stirred and heated under nitrogen. After 4 minutes the reaction mixture was at 150° C. and the HCl evolution had started. At the end of 10 minutes the temperature had reached 280° C. and the HCl evolution had subsided. The reaction mixture was then heated for 40 minutes at a temperature of 275°–281° C. At the end of this time the mixture was quite viscous and upon cooling, the polymer precipitated at about 260° C. The polymer was separated from the reaction mixture and washed 4 times with 1-liter portions of acetone, filtered and dried to give 23.2 grams of white powder. A sample of this polymer had an intrinsic viscosity of 0.79 in 2,4,6-trichlorophenol at 75° C. A one-gram sample of this polymer was pressed between aluminum foil at 415° C. under a pressure of 500 lbs./sq. inch. The resulting water-quenched film was very tough and flexible but slightly hazy.

*Example 9*

A mixture of 11.0 grams (0.10 mole) of hydroquinone, 5.6 grams (0.020 mole) of 3,3'-biphenyldicarbonyl chloride, 16.3 grams (0.080 mole) of isophthaloyl chloride, and 122.0 grams of redistilled mixed dichlorodiphenyl ethers was stirred and heated under nitrogen atmosphere. After 3 minutes of heating the temperature had reached 165° C. and a homogeneous clear solution was obtained with accompanying HCl evolution. The reaction mixture was heated another 8 minutes at which time the temperature was 312° C. At this point the solvent was refluxing and most of the HCl evolution had subsided. The solution was refluxed for another five minutes at 312° C. and allowed to cool. At a temperature of 250° C. the polymer precipitated to give a slurry. When cooled to room temperature the polymer was separated and washed with three 500 ml. portions of acetone, filtered and dried to yield 26.5 grams of white polymer, melting point 353°–367° C., having an intrinsic viscosity of 0.58 in trichlorophenol at 75° C. A sample of this polymer was pressed between aluminum foil at a temperature of 400° C. under a pressure of 2000 lbs./sq. inch. When this hot film was quenched in water there was obtained a transparent, flexible, tough film. Another sample of polymer was pressed under the same conditions but without quenching. The resulting film was also flexible, tough and transparent indicating that essentially no crystallization had occurred.

*Example 10*

A mixture of 1.38 grams of hydroquinone, 2.54 grams of isophthaloyl chloride, and 27 grams of benzophenone was stirred and heated. After 1.5 minutes the temperature had reached 100° C. and a homogeneous yellow solution was obtained. The hydrogen chloride evolution started at about 175° C. and was vigorous while the reaction mixture was heated to the reflux temperature of benzophenone, 298° C. The mixture was heated 10 minutes to reach 296° C. and then an additional 15 minutes at a temperature of 296°–298° C. The resulting red solution was quite viscous and was allowed to cool to precipitate the polymer at a temperature of 255° C. When cooled to room temperature the isolated polymer was washed twice with 500 ml. portions of boiling acetone, filtered and dried by suction. There was obtained 2.87 grams of polymer. A sample of this polymer was pressed between aluminum foil at a temperature of 415° C. under a pressure of 2000 lbs./sq. inch, followed by quenching in cold water. The resulting yellow film was quite flexible, tough and transparent.

*Example 11*

A sample of m-terphenyl was purified by redistillation in vacuo; it melted at 88.3–89.5° C. This material was used as the solvent in the following preparation of a copolymer.

A mixture of 2.20 grams (0.020 mole) of hydroquinone, 3.45 grams (0.017 mole) of isophthaloyl chloride, 0.61 gram (0.0030 mole) of terephthaloyl chloride, and 43 grams of redistilled m-terphenyl was stirred and heated. After 6 minutes of heating the temperature had reached 165° C. and a homogeneous yellow solution was obtained which was accompanied with copious HCl evolution. After 11 minutes of heating the reaction mixture had reached 330° C. and the mixture was subsequently heated for another 30 minutes at a temperature which varied from 320° to 338° C. During this time, the polymerization had proceeded to yield a very viscous solution. The reaction mixture was allowed to cool, and the polymer precipitated at a temperature of 255° C. The polymer was isolated from the reaction mixture, washed 4 times with 500 ml. portions of boiling acetone, filtered and allowed to dry by suction. There was obtained 4.60 grams (95.8%) of polymer. A sample of this polymer had a chlorine content of 0.07%. The intrinsic viscosity of this polymer was determined as 0.80 in 2,4,6-trichlorophenol at 75° C. A sample of this polymer was pressed between aluminum foil at 415° C. under a pressure of 2000 lbs./sq. inch. The hot film was quenched in water to yield a tough, flexible and transparent film.

*Example 12*

A mixture of 1.138 grams (0.0125 mole) of hydroquinone, 2.16 grams (0.0106 mole) of redistilled isophthaloyl chloride, 0.38 gram (0.0019 mole) of redistilled terephthaloyl chloride, and 22.48 grams of o-bromobiphenyl, was stirred and heated. At a temperature of 110° C. a homogeneous yellow solution was obtained accompanied with the start of HCl evolution. After 4 minutes of heating the temperature had reached 283° C. and the solvent had started to reflux. The reaction mixture was heated for an additional 8 minutes at a temperature of 260°–290° C. There was obtained a very viscous brown solution. When allowed to cool, the polymer precipitated at 250° C. to yield a stiff, pasty mixture. The polymer was separated and washed 4 times with 500 ml. portions of refluxing acetone, filtered and dried to yield 2.78 grams (92.7%) of polymer. A sample of this polymer had an intrinsic viscosity of 1.06 in 2,4,6-trichlorophenol at 75° C. The polymer was pressed between aluminum foil at 415° C. under a pressure of 2000 lbs./sq. inch. The hot film was quenched in cold water to give a light brown, flexible, transparent, tough film.

*Example 13*

A mixture of 5.50 grams of hydroquinone, 10.15 grams of isophthaloyl chloride, 0.12 gram of phenol, and 120 grams of mixed dichlorodiphenyl ether was stirred and heated. At 150° C., a homogeneous solution resulted and the HCl evolution started. After 7 minutes of heating, the temperature was 312° C. and the clear, light yellow solution was refluxing. The reaction mixture was then heated for an additional 30 minutes at a temperature of 308°–312° C. During this time the HCl evolution had ceased and the solution became quite viscous. When the reaction was allowed to cool, the polymer precipitated at 287° C., to yield a pasty mixture. The polymer was separated and washed 4 times with 750 ml. portions of hot acetone, filtered and dried. There was obtained 11.37 grams of dried polymer. A sample of polymer had an intrinsic viscosity of 0.77 in trichloroacetic acid at 75° C. A one-gram sample of polymer was pressed between aluminum foil at 400° C. under a pressure of 2000 lbs./sq. inch. After quenching, the resulting film was flexible, strong, and extremely clear.

*Example 14*

A mixture of 1.38 grams (0.0125 mole) of hydroquinone, 2.16 grams (0.0106 mole) of redistilled isophthaloyl chloride, 0.38 (0.0019 mole) of terephthaloyl chloride, and 27 grams of p-bromophenyl phenyl ether was stirred and heated. At 105° C. the reaction mixture became homogeneous. The HCl evolution began at a temperature of 140° C. After 5 minutes of heating the temperature had reached 288° C. and the solvent was then refluxing. The reaction was heated for an additional 19 minutes at a temperature of 288°–300° C. During this time the yellow reaction mixture became quite viscous and when cooled, the polymer precipitated at 255° C. to form a stiff paste. The polymer was isolated and washed 4 times with 500 ml. portions of boiling acetone, filtered and dried by suction. There was obtained 2.86 grams (95.5%) of polymer. A sample of this polymer had an intrinsic viscosity of 0.91 in 2,4,6-trichlorophenol at 75° C. Another sample of polymer was pressed between aluminum foil at 415° C. under a pressure of 2000 lbs./sq. inch. The hot film was quenched in cold water to yield a light yellow, flexible, transparent, tough film.

*Example 15*

A mixture of 14.5 grams (0.10 mole) of chlorohydroquinone, 20.3 grams (0.10 mole) of redistilled isophthaloyl chloride, and 300.0 grams of redistilled mixed pentachlorobiphenyls was stirred and heated in a nitrogen atmosphere. At 125° C. the reaction mixture became homogeneous. A total of 15 minutes was required to get the reaction mixture from room temperature to 349° C., where the solvent was refluxing. The reaction mixture was heated an additional 7 minutes at 345°–349° C. during which time the solution became quite viscous. When allowed to cool the polymer precipitated at 210° C. The polymer was washed 3 times with 700 ml. portions of acetone, filtered and dried by suction to give 24.7 grams of white powder. A sample of this polymer had an intrinsic viscosity of 0.62 in 2,4,6-trichlorophenol at 75° C. The polymer had a melting point of 348°–355° C. A one gram sample of polymer was pressed between aluminum foil at a temperature of 350° C. under a pressure of 1500 lbs./sq. inch. When the hot film was allowed to cool in air a transparent, flexible, tough film was obtained.

*Example 16*

A mixture of 8.80 grams (0.080 mole) of hydroquinone, 4.60 grams (0.020 mole) of recrystallized 2,2'-bis(4-hydroxyphenyl)propane, 20.30 grams (0.100 mole) of redistilled isophthaloyl chloride, and 125.0 grams of redistilled mixed pentachlorobiphenyls was stirred and heated in a nitrogen atmosphere. At 160° C. a homogeneous solution was obtained which was accompanied with HCl evolution. After 10 minutes of heating, the reaction mixture was at a temperature of 345° C. where it was refluxing, which was continued for another 5 minutes. The reaction mixture was very viscous and when allowed to cool, the polymer precipitated at 250° C. The polymer was isolated and washed 6 times with 200 ml. portions of acetone, filtered and air-dried to yield 25.4 grams of white polymer, melting at 343°–358° C. A sample of this polymer had an intrinsic viscosity of 0.54 in 2,4,6-trichlorophenol at 75° C. Samples of this polymer were pressed between aluminum foil at temperatures of 350°–400° C. and pressures of 750–1000 lbs./sq. inch. The resulting films were water-white, completely transparent, flexible and tough whether they were quenched in water or allowed to slow cool from the hot pressing temperature. A sample of film had a tensile strength of 9000 lbs./sq. inch and an elongation of 28%.

*Example 17*

A mixture of 12.8 grams (0.103 mole) of toluhydroquinone, 20.3 grams (0.100 mole) of redistilled isophthaloyl chloride, and 170.0 grams of redistilled mixed monochlorobiphenyls was stirred and heated under nitrogen. A clear, homogeneous solution was obtained at 118° C., and the reaction began at 165° C., as evidenced by HCl evolution. After 9 minutes, the reaction mixture was 285° C., and the reaction was then refluxed at 289°–290° C. for an additional 16 minutes. The resulting solution was viscous and when allowed to cool, the polymer precipitated at 205° C. The polymer was washed with one liter of acetone, and washed twice more with 100 ml. portions of acetone. The polymer was filtered and dried to yield 26.0 grams of polymer, melting point 320°–332° C. with decomposition. A film of this polymer was obtained by pressing it between aluminum foil at 380° C. under a pressure of 1000 lbs./sq. inch. When quenched to room temperature in cold water, the resulting film was transparent, flexible and tough.

*Example 18*

A mixture of 1.85 grams (0.0100 mole) of phenylhydroquinone, 3.30 grams (0.0300 mole) of hydroquinone, 8.15 grams (0.0401 mole) of redistilled isophthaloyl chloride, and 70.0 grams of redistilled mixed pentachlorobiphenyls, was stirred and heated under nitrogen. At 170° C. a homogeneous solution was obtained which was accompanied with HCl evolution. After 11 minutes, the temperature was 348° C. where the solvent was refluxing. The reaction mixture was then heated for another 10 minutes at 348°–350° C., at which point a very viscous solution was obtained. The reaction mixture was allowed to cool, thereby allowing the polymer to precipitate at about 225° C. The isolated polymer was washed twice with 500 ml. portions of acetone, filtered and dried to give 10.2 grams of polymer, melting point 320°–342° C. A sample of this polymer had an intrinsic viscosity of 0.54 in a 50–50 mixture of orthochlorophenol and 2,4,6-trichlorophenol at 117° C. Tough, clear, flexible films of this polymer were obtained by pressing samples of the polymer between aluminum foil at temperatures of 400°–415° C. under 2000–3000 lbs./sq. inch. The resulting films were flexible and transparent, whether they were slowly air-cooled or quenched in water.

*Example 19*

A mixture of 8.90 grams (0.0809 mole) of hydroquinone, 3.80 grams (0.0201 mole) of bromohydroquinone, 20.30 grams (0.100 mole) of redistilled isophthaloyl chloride, and 200.0 grams of redistilled mixed monochlorobiphenyls was stirred and heated under nitrogen. The reaction was heated for 9 minutes from 20° C.–284° C. and refluxed for 17 minutes at 284°–290° C. The viscous solution was cooled to precipitate the polymer at 275° C. The polymer was washed twice with one-liter portions of refluxing acetone, filtered and dried to give 25.1 grams of free-flowing powder. A sample of this polymer had a melting point of 380°–386° C. and had an intrinsic viscosity of 0.64 in 2,4,6-trichlorophenol at 75° C. A one gram sample of polymer was pressed between aluminum foil at 400° C. and 2000 lbs./sq. inch pressure. The resulting hot film was quenched in cold water to give a tan, flexible, tough film.

*Example 20*

A mixture of 7.70 grams (0.070 mole) of hydroquinone, 6.70 grams (0.030 mole) of 2,5-ditertiarybutyl hydroquinone (resublimed in vacuo), 20.30 grams (0.100 mole) of redistilled isophthaloyl chloride, and 200.0 grams of redistilled mixed trichlorobiphenyls, was stirred and heated under nitrogen. A homogeneous solution was obtained at 210° C. and after 11 minutes of heating the temperature had reached 330° C., which was the refluxing temperature for the solvent. The reaction mixture was then heated another 5 minutes at reflux to give a viscous solution. The mixture was allowed to cool precipitating the polymer at 160° C. The polymer was washed 3 times with two-liter portions of acetone, filtered and dried to give 23.2 grams of light yellow polymer. A sample of this polymer had a melting point of 320°–402° C. and an intrinsic viscosity of 0.69 measured in 2,4,6-trichlorophenol at 75° C. Samples of this polymer were pressed between aluminum foil at temperatures of 340°–350° C. and pressures of 1500–2000 lbs./sq. inch. Tan, flexible tough films were obtained whether the hot films were allowed to cool slowly to room temperature or were quenched in cold water.

Example 21

A mixture of 2.15 grams (0.0101 mole) of 4,4'-dihydroxybenzophenone, 3.30 grams (0.0300 mole) of hydroquinone, 8.15 grams (0.0400 mole) of redistilled isophthaloyl chloride, and 62.0 grams of redistilled mixed trichlorobiphenyls, was stirred and heated under nitrogen. After 4 minutes of heating, a homogeneous orange solution was obtained at 160° C., accompanied with HCl evolution. An additional 8 minutes of heating brought the temperature to 310° C., where it was kept for 2 minutes. At this point the viscous reaction mixture was allowed to cool and the polymer precipitated at 230° C. When cooled to room temperature the polymer was washed 4 times with 500 ml. portions of acetone, filtered and dried to give 10.5 grams of polymer melting at 341°–350° C. Samples of polymer were pressed into films between aluminum foil at 400° C. under 1000 lbs./sq. inch pressure. Tan, flexible, tough films were obtained whether the hot films were allowed to cool slowly at room temperature or quenched in cold water. The density of the water-quenched polymer was 1.3250 at 25° C., while the density of the air-cooled polymer was 1.3265.

Example 22

A mixture of 11.2 grams (0.102 mole) of resorcinol, 20.3 grams (0.100 mole) of redistilled terephthaloyl chloride, and 209.0 grams of redistilled mixed trichlorobiphenyl was stirred and heated under nitrogen. A clear, homogeneous solution was obtained at 140° C. The reaction mixture was heated for a total of 9 minutes to 335° C. and the solvent was refluxing. The polymerization was allowed to continue for an additional 3 minutes at 330°–335° C. to form a viscous solution. The mixture was allowed to cool whereby the polymer precipitated at 185° C. The separated polymer was washed 3 times with 1-liter portions of acetone, filtered and dried to yield 20.8 grams of white powder melting at 281°–295° C. A sample of this polymer had an intrinsic viscosity of 0.66 in 2,4,6-trichlorophenol at 75° C. Strong, flexible, transparent films were obtained by pressing this polymer between aluminum foil at temperatures of 350°–380° C. and pressures of 1000–2000 lbs./sq. inch. The films were transparent whether the hot films were quenched in cold water or allowed to cool slowly in air. The density of water-quenched films was 1.3375 at 25° C., while the density of air-cooled samples was 1.3385–1.3395 at 25° C. This small difference in density indicates that very little crystallization occurred on slow-cooling the polymer.

Example 32

A mixture of 8.40 grams (0.0764 mole) of redistilled resorcinol, 20.30 grams (0.100 mole) of redistilled terephthaloyl chloride, and 200.0 grams of redistilled mixed trichlorobiphenyls, was stirred and heated under nitrogen. At 140° C. a homogeneous solution was obtained. After 15 minutes the solvent was refluxing and the temperature was 320° C. The mixture was heated 7 minutes at 320°–324° C. and then allowed to cool. When it had cooled to 280° C., 2.80 grams (0.0254 mole) of hydroquinone was added and the heating was resumed. The reaction was finally heated for 10 minutes at a temperature of 310°–320° C. At the end of this time, a viscous solution was obtained which was allowed to cool. The polymer precipitated at 220° C. to give a thick, pasty mixture. The polymer was washed twice with two-liter portions of acetone, chopped up in a blender and rewashed with additional acetone. It was filtered and dried to give 21.5 grams of white powder melting at 295°–336° C. A sample of this polymer had an intrinsic viscosity of 0.95 in 2,4,6-trichlorophenol at 75° C. Tough, flexible, transparent films of this polymer were obtained by pressing at 415° C. under a pressure of 2000 lbs./sq. inch, between aluminum foil. The films were flexible, whether the polymer was quenched in cold water or allowed to cool slowly.

Example 24

A mixture of 3.30 grams of catechol (0.03 mole), 7.80 grams of hydroquinone (0.071 mole), 12.20 grams of isophthaloyl chloride (0.060 mole), and 75.0 grams of a redistilled mixture of monochlorobiphenyls was heated while stirring in a reaction flask which had been flushed with dry nitrogen. After 9 minutes the temperature had reached 240° C., and the reaction mixture had become homogeneous. At the end of 13 minutes, the temperature was 280° C. and heating was discontinued. After 17 minutes, the temperature had dropped to 220° C. At this point, 8.10 grams of terephthaloyl chloride (0.04 mole) was added and heating resumed. At the end of 23 minutes, the temperature had reached 270° C. and at the end of 32 minutes, the temperature was 282° C. This temperature was maintained within a few degrees for the balance of the reaction period of a total of 50 minutes. The solution was allowed to cool to 170° C. where the polymer precipitated as a white solid. After cooling to room temperature, the reaction mixture was diluted with 2 liters of acetone and the liquid decanted. The solid polymer was washed 3 more times with 2-liter portions of fresh acetone. It was then dispersed in 2 liters of boiling acetone, filtered and dried. The yield was 21.3 grams of a white polymer in powder form. The polymer had a melting range of 307°–328° C. and an intrinsic viscosity of 0.92, measured at 75° C. in trichlorophenol. A sample of the polymer was molded at 370° C. and 1500 lbs./sq. inch pressure, followed by quenching in water to give a very clear, flexible film. If the film was not quenched in water but allowed to cool in air, a slight haze developed, indicating some crystallinity. However, the film was flexible. The polymer was very soluble in tetrachloroethane. A 2½% solution is very fluid and can be cast on a glass plate to produce a very clear film. When this film on a glass plate is heated to 200° C., it forms a very interesting product. It is extremely tough and abrasion-resistant and the bond between the polymer and glass plate is so strong that it is impossible to remove the film with a razor blade.

As the above disclosure has shown, the process of the present invention may be used for the preparation of polymeric esters whose uses are well known, and which are more fully described in the copending applications previously noted. The linear polyesters prepared in accordance with our invention find wide utility for the manufacture of films, fibers, molded or extruded parts, and surface coatings for use in structural, decorative, and electrical applications, as more fully described in the applications claiming the compositions, for example, the films and fabrics or mast made from the fibers prepared according to the method of this invention can be used as dielectrics, for example, as dielectrics in capacitors, as slot insulation for motors, primary insulation for heat-resistant wire, pressure sensitive electrical tapes, split mica insulating tape, i.e., mica sheet laminated between films, small condensers, metal foil laminated to film, or film having an adherent metal coating, weather-resistant electrical wire, i.e., a conductor wrapped with film coated with asphalt as wrapping for submerged pipe to insulate against ground currents, as primary and secondary insulation in transformer construction, as a dielectric in electroluminescent structures, etc. They may also be used to laminate or adhere glass or metal surfaces to themselves, to each other, or to a like surface. Two mating glass objects may be heat-sealed vacuum-tight by inserting an interlayer of the superpolyester either as a powder, as a film, or as a surface coating between two glass surfaces to be joined. Pressure or vacuum is applied to the assembly after it is heated to the softening point of the superpolyester to firmly adhere the two glass surfaces together. This process may be used for forming vacuum-tight seals between two mating glass surfaces such as for making cathode ray tubes and other devices as disclosed and claimed in the copending application Serial No. 33,129, Day et al, filed concurrently herewith and assigned to the same assignee as the present invention.

As will be readily apparent to those skilled in the art, obvious modifications and widely different embodiments may be used in the carrying out of our process, such as the adding of pigments, fillers, stabilizers, plasticizers, etc., which may be added during the process of making our polymers to modify their properties without departing from the spirit and scope of the invention. It is therefore to be understood that changes may be made in the particular embodiments of the invention described which are within the full intended scope of the invention as defined by the appended claims.

What we claim as new and desire to secure by Letters Patent of the United States is:

1. The process of producing a linear superpolyester of an aromatic dicarboxylic acid and a dihydric phenol which comprises reacting a mixture of reactants consisting essentially of an aromatic dicarbonyl halide and a dihydric phenol, while these reactants are dissolved in a solvent selected from the group consisting of benzophenone, m-terphenyl, chlorinated biphenyl, brominated biphenyl, chlorinated diphenyl oxide and brominated diphenyl oxide, at a temperature in the range of about 270° C. up to the reflux temperature of the solution until at least the evolution of the hydrogen halide substantially ceases, by which time the superpolyester formed has an intrinsic viscosity of at least 0.5 measured at 75° C., and isolating the solid polymer from the reaction mixture.

2. The method of claim 1 in which the aromatic dicarbonyl halide is an aromatic dicarbonyl chloride and the dihydric phenol is a dihydroxy benzene.

3. The method of claim 1 in which the aromatic dicarbonyl halide is an aromatic dicarbonyl chloride and the dihydric phenol is a dihydroxy benzene and the solvent is a chlorinated biphenyl.

4. The process of producing a linear superpolyester consisting essentially of p-phenylene isophthalate units and p-phenylene terephthalate units which comprises reacting a mixture of reactants consisting essentially of hydroquinone, an isophthaloyl halide and a terephthaloyl halide, the molar ratio being at least 7 mols of isophthaloyl halide for every 3 mols of terephthaloyl halide, while these reactants are dissolved in a solvent selected from the group consisting of benzophenone, m-terphenyl, chlorinated biphenyl, brominated biphenyl, chlorinated diphenyl oxide, and brominated diphenyl oxide, at a temperature in the range of about 270° C. up to the reflux temperature of the solution until at least the evolution of the hydrogen halide substantially ceases, by which time the superpolyester formed has an intrinsic viscosity of at least 0.5 measured at 75° C., and isolating the solid polymer from the reaction mixture.

5. The process of claim 4 wherein the isophthaloyl halide is isophthaloyl chloride and the terephthaloyl halide is terephthaloyl chloride.

6. The process of producing a linear superpolyester consisting essentially of p-phenylene isophthalate units and p-phenylene terephthalate units which comprises reacting a mixture of reactants consisting essentially of an isophthaloyl halide and hydroquinone while these reactants are dissolved in a solvent selected from the group consisting of benzophenone, m-terphenyl, chlorinated biphenyl, brominated biphenyl, chlorinated diphenyl oxide, and brominated diphenyl oxide, at a temperature of from 270° C. up to the reflux temperature of the solution until the evolution of the hydrogen halide substantially ceases, and thereafter adding a terephthaloyl halide in an amount so that there is at least 1.5 mols of the isophthaloyl halide for each mol of terephthaloyl halide, and continuing the reaction in the above-stated temperature range until the evolution of the hydrogen halide again substantially ceases, by which time the superpolyester formed has an intrinsic viscosity of at least 0.5 measured at 75° C., and thereafter isolating the polymer from the solution, there being from 1 to 1.05 mols of hydroquinone initially present for each mol of isophthaloyl halide and terephthaloyl halide reactant.

7. The process of claim 6 wherein the isophthaloyl halide is isophthaloyl chloride and the terephthaloyl halide is terephthaloyl chloride and the solvent is chlorinated biphenyl.

8. The process of producing a linear superpolyester consisting essentially of p-phenylene isophthalate units and p,p'-biphenylene isophthalate units, which comprises reacting a mixture of reactants consisting essentially of an isophthaloyl halide, hydroquinone, and 4,4'-dihydroxybiphenyl, the molar ratio being at least 2 mols of hydroquinone for each 3 mols of 4,4'-dihydroxybiphenyl, while these reactants are dissolved in a solvent selected from the group consisting of benzophenone, m-terphenyl, chlorinated biphenyl, brominated biphenyl, chlorinated diphenyl oxide, and brominated diphenyl oxide, at a temperature in the range of about 270° C. up to the reflux temperature of the solution until at least the evolution of the hydrogen halide substantially ceases, by which time the superpolyester formed has an intrinsic viscosity of at least 0.5 measured at 75° C., and isolating the solid polymer from the reaction mixture.

9. The process of claim 8 wherein the isophthaloyl halide is isophthaloyl chloride.

10. The process of preparing a linear superpolyester consisting essentially of p-phenylene isophthalate units and p,p'-biphenylene isophthalate units which comprises reacting a mixture of reactants consisting essentially of hydroquinone, and an isophthaloyl halide, while the reactants are dissolved in a solvent selected from the group consisting of benzophenone, m-terphenyl, chlorinated biphenyl, brominated biphenyl, chlorinated diphenyl oxide and brominated diphenyl oxide, at a temperature in the range of 270° C. up to the reflux temperature of the solution until the evolution of the hydrogen halide substantially ceases, and thereafter adding 4,4'-dihydroxybiphenyl in an amount so that there is at least 2 mols of hydroquinone for each 3 mols of 4,4'-dihydroxybiphenyl, and continuing the reaction in the temperature range stated above, until at least the hydrogen halide again substantially ceases, by which time the superpolyester has an intrinsic viscosity of at least 0.5 measured at 75° C., and isolating the solid polymer from the reaction mixture.

11. The process of claim 10 wherein the isophthaloyl halide is isophthaloyl chloride and the solvent is chlorinated biphenyl.

12. The process of producing a chlorine-containing linear superpolyester consisting essentially of a chlorinated p-phenylene isophthalate which comprises reacting a mixture of reactants consisting essentially of hydroquinone and an isophthaloyl chloride, at least 15 mol percent of which is chlorinated isophthaloyl chloride and the balance of which is isophthaloyl chloride, while these reactants are dissolved in a solvent selected from the group consisting of benzophenone, m-terphenyl, chlorinated biphenyl, brominated biphenyl, chlorinated diphenyl oxide, and brominated diphenyl oxide, at a temperature in the range of about 270° C. up to the reflux temperature of the solution until at least the evolution of the hydrogen chloride substantially ceases, at which time the superpolyester has an intrinsic viscosity of at least 0.5 measured at 75° C., and isolating the solid polymer from the reaction mixture.

13. The process of producing a linear superpolyester of an aromatic dicarboxylic acid and a dihydric phenol which comprises reacting a mixture of reactants consisting essentially of (1) hydroquinone, (2) a dihydric phenol selected from the group consisting of catechol, resorcinol, and 2,2'-dihydroxybiphenyl, the molar ratio being at least 1 mol of hydroquinone for each mol of the dihydric phenol of (2), (3) an isophthaloyl halide and a terephthaloyl halide, the molar ratio being at least 1 mol of isophthaloyl halide for each mol of terephthaloyl halide, while these reactants are dissolved in a solvent selected from the group consisting of benzophenone, m-terphenyl, chlorinated biphenyl, brominated biphenyl, chlorinated diphenyl oxide and brominated diphenyl oxide, at a temperature in the range of about 270° C. up to the reflux temperature of the solution until at least the evolution of the hydrogen halide substantially ceases, by which time the superpolyester has an intrinsic viscosity of at least 0.5 measured at 75° C., and isolating the solid polymer from the reaction mixture.

14. The process of claim 13 wherein the isophthaloyl halide is isophthaloyl chloride and the terephthaloyl halide is terephthaloyl chloride.

15. The process of producing a linear superpolyester of an aromatic dicarboxylic acid and a dihydric phenol which comprises reacting a mixture of reactants consisting essentially of resorcinol, from 0 to 30 mol percent hydroquinone based on the total amount of resorcinol and hydroquinone, and a terephthaloyl halide, while these reactants are dissolved in a solvent selected from the group consisting of benzophenone, m-terphenyl, chlorinated biphenyl, brominated biphenyl, chlorinated diphenyl oxide, and brominated diphenyl oxide, at a temperature in the range of about 270° C., up to the reflux temperature of the solution until at least the evolution of the hydrogen halide substantially ceases, by which time the superpolyester has an intrinsic viscosity of at least 0.5 measured at 75° C., and isolating the solid polymer from the reaction mixture.

16. The process of claim 15 wherein the terephthaloyl halide is terephthaloyl chloride.

References Cited by the Examiner

UNITED STATES PATENTS

| 2,595,343 | 5/52 | Drewitt et al. | 260—47 |
| 2,854,434 | 9/58 | Beaman | 260—47 |
| 3,023,192 | 2/62 | Shivers | 260—75 |

FOREIGN PATENTS

| 553,841 | 6/57 | Belgium. |
| 1,175,362 | 11/58 | France. |

WILLIAM H. SHORT, *Primary Examiner.*

H. N. BURSTEIN, P. E. MANGAN, *Examiners.*